United States Patent [19]
Pasch et al.

[11] Patent Number: 6,021,955
[45] Date of Patent: Feb. 8, 2000

[54] METHOD AND APPARATUS FOR CONTROLLING THE SPEED OF A DAMPER BLADE

[75] Inventors: Roger M. Pasch, Sun Prairie; Timothy L. Guetersloh, Deerfield, both of Wis.

[73] Assignee: Research Products Corporation, Madison, Wis.

[21] Appl. No.: 09/108,519

[22] Filed: Jul. 1, 1998

[51] Int. Cl.⁷ ..................................................... F16K 31/04
[52] U.S. Cl. .................... 236/49.3; 236/1 B; 251/129.13
[58] Field of Search .................... 236/49, 3, 1 B, 236/1 G; 126/285 B; 251/129.02, 129.13, 48, 64; 318/362, 363, 375

[56] References Cited

U.S. PATENT DOCUMENTS

| | | | |
|---|---|---|---|
| 4,185,770 | 1/1980 | Nagel | 251/129.13 X |
| 4,262,652 | 4/1981 | Butzen | 126/285 B |
| 4,545,363 | 10/1985 | Barchechat et al. | 126/285 B |

*Primary Examiner*—Harry B. Tanner
*Attorney, Agent, or Firm*—Andrus, Sceales, Starke & Sawall

[57] ABSTRACT

A device for controlling the movement of a damper mounted in a housing between an open position and a closed position comprises a shaft rotatably secured to the damper for pivoting the damper between an open position and a closed position. A lever arm is mounted on the shaft for rotation therewith, and a spring is connected between the housing and the lever arm for normally urging the damper towards the open position. A motor is mounted on the housing and is actuable to overcome the force of the spring to move the damper to the closed position. A control arrangement associated with the housing is provided for regulating the speed of the damper as the damper moves from the closed position to the open position.

11 Claims, 11 Drawing Sheets

METHOD AND APPARATUS FOR CONTROLLING THE SPEED OF A DAMPER BLADE

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates broadly to a heating and cooling system including a damper blade assembly rotatably mounted within a duct to deliver conditioned air to an enclosure, and in particular, pertains to a control arrangement for regulating the speed of the damper blade assembly as the damper blade assembly moves from a closed position to an open position.

BACKGROUND OF THE INVENTION

This application relates to an improvement in a damper blade control as set forth in U.S. Ser. No. 09/111,826, filed Jul. 8, 1998, the disclosure of which is herein incorporated by reference.

In the above-specified application, a device for controlling the movement of the damper mounted in a housing between an open position and a closed position comprises a shaft rotatably secured to the damper for pivoting the damper between the open position and the closed position. A lever arm is mounted on the shaft for rotation therewith, and a spring is connected between the housing and the lever arm for normally urging the damper towards the open position. A motor and gear train is mounted on the housing and is actuable to overcome the force of the spring to move the damper to the closed position. A force translation arrangement in the form of a wind-up spool and a flexible band is disposed between the motor and the lever arm for translating the driving force of the motor when the motor is energized to move the damper to the closed position, and for gradually braking the motor due to its internal friction when the motor is de-energized and the spring returns the damper to the open position.

In particular, each device typically controls one or more damper blades mounted on respective shafts in a single housing. With the heating and cooling system in operation, the motor responds to a control arrangement which sends a signal corresponding to the thermostat in a specific zone of the system. The damper blade assembly is designed so that upon movement of the damper blades to their open position, slack will be created in the band thereby preventing damaging force from being transferred to the motor and its gear train. When the motor is energized as dictated by the control arrangement, the motor and gear train will rotate the spool such that the band will be wound thereon, and will transfer a pulling force which overcomes the spring to rotate the lever arm, the shafts and damper blades to their closed position at which a stop surface engages a stop post. It should also be seen that a portion of the spring is wrapped around a hub of the lever arm as the damper blades move to a closed position. As long as the motor continues to be energized, damper blades remain closed.

When the motor is de-energized, the force of the spring will reversibly rotate the lever arm, the shafts and damper blades, motor and gear train, which move together until the stop surface re-engages the stop post. In a damper designed without over-stress protection as provided by the above-mentioned application, the gear train and motor would be subjected to a sudden stop, inflicting almost certain damage to these drive elements. Because of the spool and flexible band which begins to unwind upon engagement between the stop surface and stop post, the motor and its gear train continue to rotate by their inertia and enable a gradual braking or slow down of motor and gear train due to internal friction to prevent damage thereto. The spool and flexible band thus act as a force translation arrangement in ensuring the positive opening and closing of damper blades without harm to the driving mechanism.

In using the damper control described above, it is noted that the only force counteracting the opening force of the spring is the internal friction of the motor and its gear train. Due to the fact that the blade opening is caused by a spring force and the blade closing is generated by a motor, the opening phase of the damper blades has a higher speed than the closing phase which results in problems of excessive noise, wear and overtravel of the motor and its gear train. In addition, unwinding of the band on the spool as the damper moves to its open position creates a time delay in rewinding the band on the spool when the motor is again energized to close the damper blades.

As a result, it is desirable to provide the damper blades with a control arrangement associated with the motor and its gear train for regulating the opening speed of the damper blades in a manner which will minimize the problems identified above. In one embodiment, it is desirable to provide an electrical control arrangement which will periodically energize the motor as the damper blades move from the closed position to the open position. In another embodiment, it is desirable to provide a mechanical control arrangement in which a dash pot is used to dampen the opening movement of the damper blade.

BRIEF SUMMARY OF THE INVENTION

The present invention advantageously provides a damper blade control system employing a management arrangement for controllably counteracting the opening force of the spring and regulating the speed of the damper blade opening so as to preserve the mechanical integrity of the system. With such an arrangement, an enhanced damper blade control is provided which ensures positive opening and closing of the damper without exceedingly high manufacturing, installation and servicing costs.

It is an object of the present invention to effectively regulate the flow of conditioned air through a supply duct to a discharge outlet located in an enclosure.

It is a further object of the invention to effectively control the position of a damper blade mounted within a duct to control the conditioned air flow through the duct.

It is yet another object of the invention to effectively control the opening speed of a damper blade mounted within a duct to control the conditioned air flow through the duct.

It is an additional object of the invention to periodically energize the damper motor as the damper blades move from a closed position to an open position.

It is also an object of the invention to provide damping or cushioning of the damper blade as it moves to an open position.

Still a further object of the invention is to selectively pulse the motor during the damper's opening phase so as to counteract the opening force of the spring.

Still another object of the invention is to provide a method for controlling the opening speed of the damper blades.

In one aspect of the invention, there is contemplated a device for controlling the movement of a damper mounted in a housing between an open position and a closed position. The device includes a shaft rotatably secured to the damper for pivoting the damper between the open position and the closed position. A lever arm is mounted on the shaft for rotation therewith, and a spring is connected between the housing and the lever arm for normally urging the damper towards the open position. A motor is mounted on the housing and is actuable to overcome the force of the spring to move the damper to the closed position. The improvement resides in a control arrangement associated with the housing for regulating the speed of the damper as the damper moves from the closed position to the open position. The control may be either an electrical arrangement or a mechanical arrangement. The electrical arrangement includes at least one pulsing and logic circuit which includes a power source, a first openable and closable thermostat controlling a first zone to be temperature controlled, a second openable and closable thermostat closing a second zone to be temperature controlled, a first control circuit and a second control circuit for controlling the damper in response to thermostat output signals, and a microprocessor for controlling the first control circuit and the second control circuit depending upon the demand of the first zone and the second zone. The first control circuit and the second control circuit each include a first control relay having a first set of openable and closable contacts, a second control relay having a second set of openable and closable contacts, a first resettable timer having first and second sets of openable and closable contacts, and a second resettable timer having a first set of openable and closable contacts. The first set of contacts of the first timer is closed and the second set of contacts of the second control relay is closed when the second thermostat is open. Upon closing of the second thermostat, the first control relay and the first set of contacts of the first control relay close to actuate the motor so as to close the damper, the second control relay being actuated to open the second set of contacts of the second control relay and reset the first timer. Upon reopening of the second thermostat, the first control relay is de-energized and the first set of contacts of the first control relay open removing power from the motor and the second control relay, causing the damper in the first zone to begin opening, the second set of contacts of the second control relay closing to activate the first timer to open the first set of contacts of the first timer to block power from reaching the first control relay and close the second set of contacts of the first timer to supply power to the second timer. The second timer establishes a cycle holding the first set of contacts of the second timer open for a first predetermined amount of time, and then closing the first set of contacts of said second timer for a second predetermined amount of time during which power supplied to the motor of the first zone to decelerate the opening speed thereof. The second timer repeats the cycle before a third predetermined amount of time is reached after which the first timer deactivates to open the second set of contacts of the first timer and the deactivates the second timer.

In another aspect of the invention, a device for controlling the movement of a damper mounted in a housing between an open position and a closed position comprises a shaft rotatably secured to the damper for pivoting the damper between the open position and the closed position. A lever arm is mounted on the shaft for rotation therewith, and the spring is connected between the housing and the lever arm for normally urging the damper towards the open position. A motor is mounted on the housing and is actuable to overcome the force of the spring to move the damper to the closed position. A wind-up spool is mounted on the housing in driving engagement with the motor and a flexible band is connected between the lever arm and the spool, the band being selectably windable and unwindable from the spool. A control arrangement is connected to the motor for periodically energizing the motor to control the speed of the damper as the damper moves from the closed position to the open position to thereby reduce the noise, wear and overtravel.

In another aspect of the invention, a device for controlling the movement of a damper mounted in a housing between an open position and a closed position comprises a shaft rotatably secured to the damper for pivoting the damper between the open position and the closed position. A lever arm is mounted on the shaft for rotation therewith, and a spring is connected between the housing and the lever arm for normally urging the damper towards the open position. A motor is mounted on the housing and is actuable to overcome the force of the spring to move the damper to the closed position. A wind-up spool is mounted on the housing in driving engagement with the motor, and a flexible band is connected between the lever arm and the spool, the band being selectively windable and unwindable from the spool. A control arrangement is operatively connected between the lever arm and the housing for damping the force of the spring as the damper moves from the closed position to the open position to thereby reduce the noise, wear and overtravel effects normally occurring in the device.

Still yet another aspect of the invention resides in a method for controlling the movement of a damper mounted in a housing between an open position and a closed position. The method comprises the steps of rotatably securing a shaft to the damper for pivoting the damper between the open and the closed position; mounting a lever arm on the shaft for rotation therewith; connecting a spring between the housing and the lever arm for normally urging the damper towards the open position; mounting a motor on the housing so as to overcome the force of the spring to move the damper to the closed position; and providing a control arrangement associated with the housing for controllably counteracting the force of the spring as the damper moves from the closed position to the open position.

A still further object of the invention is contemplated in a mechanism for driving at least one damper supported in a housing for motion between an open position and a closed position. At least one rotatable shaft is secured to the at least one damper for pivoting the at least one damper between the open position and the closed position. A lever arm is mounted on the at least one shaft for rotation therewith, the lever arm having a pair of stop surfaces. A pair of stops is secured to the housing, each of the stops being engageable with one of the stop surfaces to define limits of travel of at least the one damper corresponding to the open position and the closed position. A biasing device is connected between the housing and the lever arm for normally urging the at least one damper towards the open position. A spool is rotatably mounted on the housing, and a flexible band extends between the spool and the lever arm, the band being windable upon the spool. A motor and gear train are drivingly connected to the spool. A control circuit is connected to the motor and the gear train for pulsingly controlling the motor as the damper moves from the closed position to the open position under the influence of the biasing device to thereby minimize the noise, wear and overtravel normally occurring in the gear train.

Various other objects, features and advantages of the invention will be made apparent from the following description taken together with the drawings.

BRIEF DESCRIPTION OF THE SEVERAL VIEWS OF THE DRAWING

The drawings illustrate the best mode presently contemplated of carrying out the invention.

In the drawings.

DETAILED DESCRIPTION OF THE INVENTION

The present invention is particularly well suited for heating and cooling systems utilizing zoned control, the air flow to each zone being controlled by a motorized damper blade assembly 10 embodying the present invention. By strategically locating the motorized damper blade assembly 10 in the heating and cooling systems, each zone can be controlled by its own thermostat set to a different temperature. If desired, the thermostats could also be set to the same temperature so as to balance the different heat loss rates in the zones.

Figure 1:
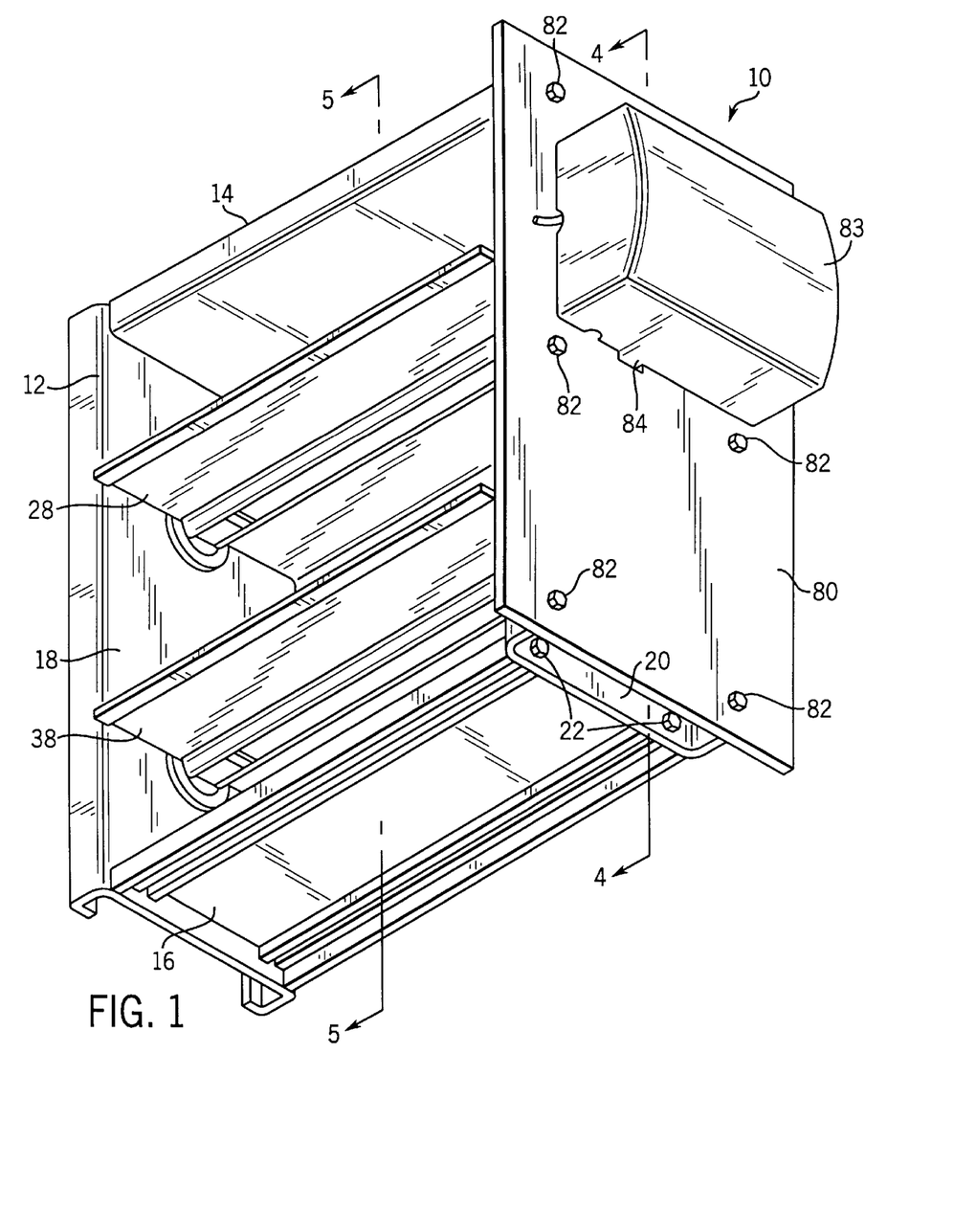
FIG. 1 is a perspective view of a damper housing having a damper control embodying the present invention so as to control the movement of a pair of damper blades.
Figure 2:
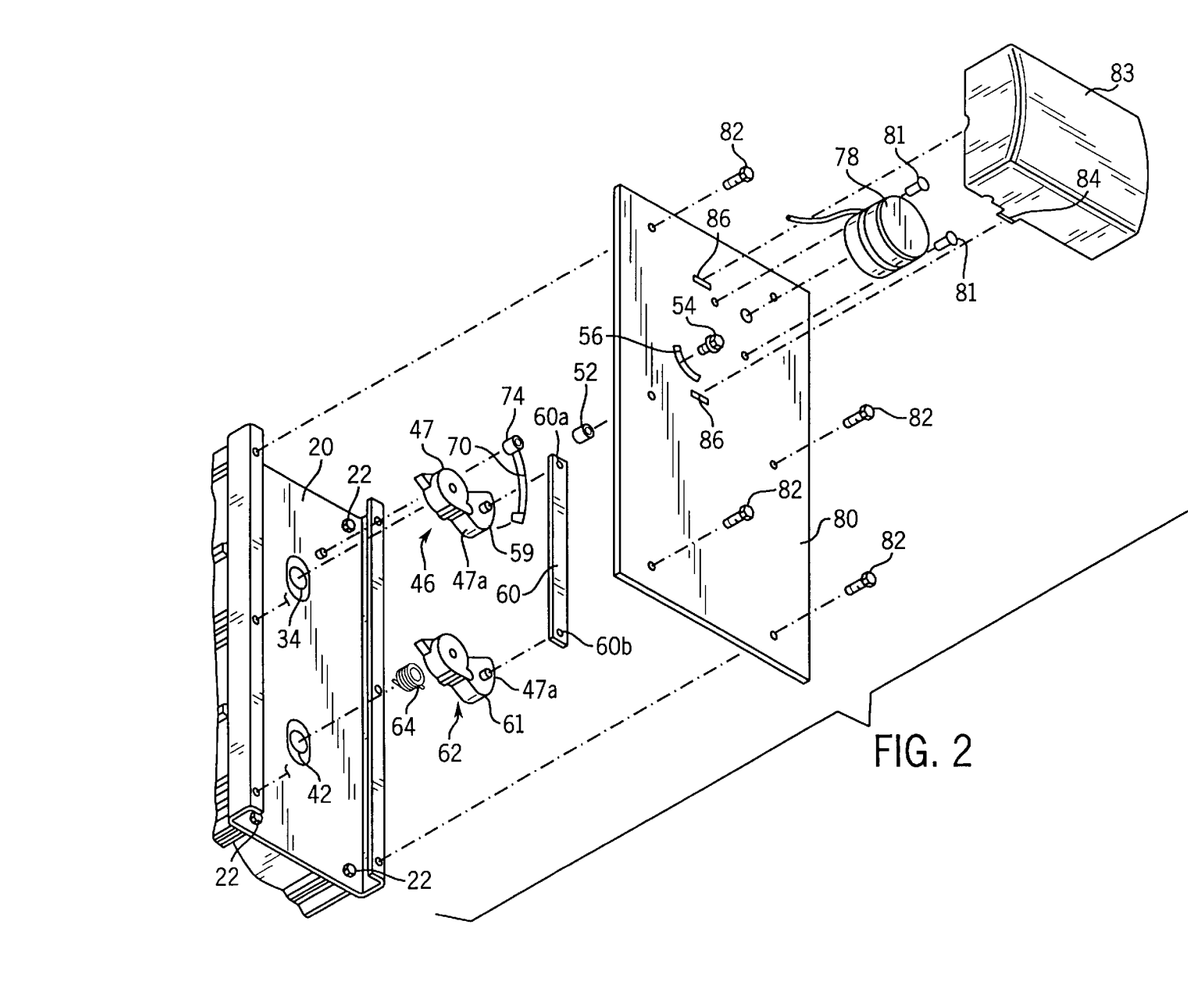
FIG. 2 is an exploded view of a portion of the damper control shown in FIG. 1.
Figure 3:
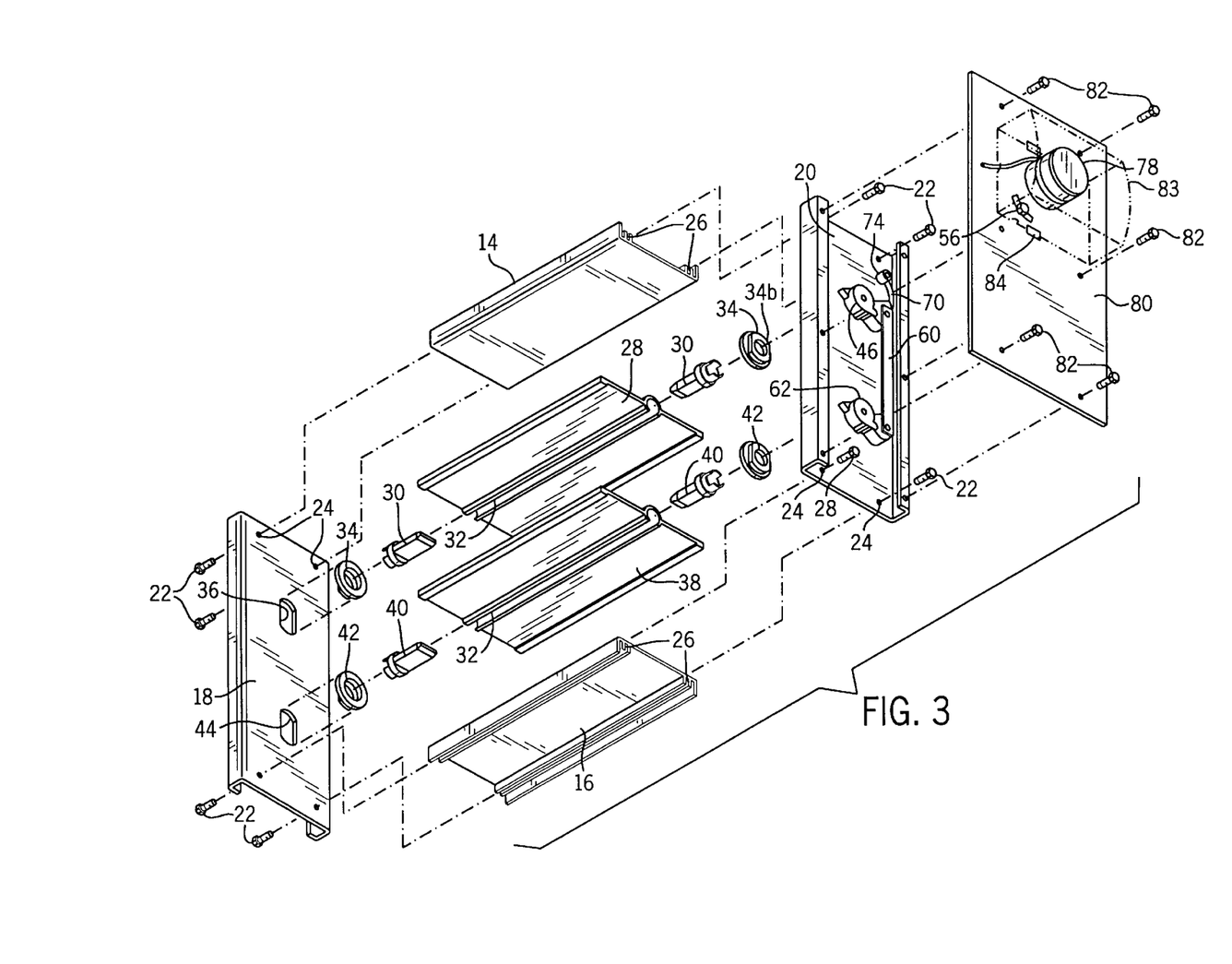
FIG. 3 is an exploded view of the entire damper control shown in FIG. 1.
Figure 4:
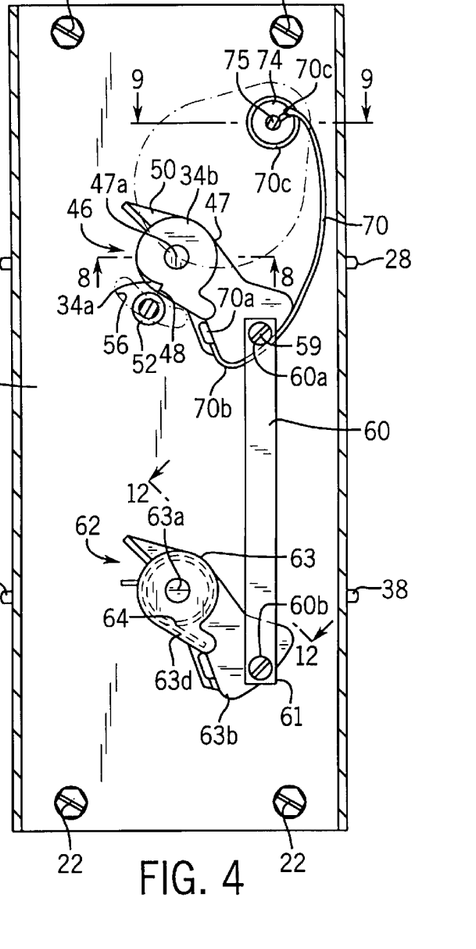
FIG. 4 is a sectional view of the damper control shown in the open position as taken on line 4—4 of FIG. 1.
Figure 13A:
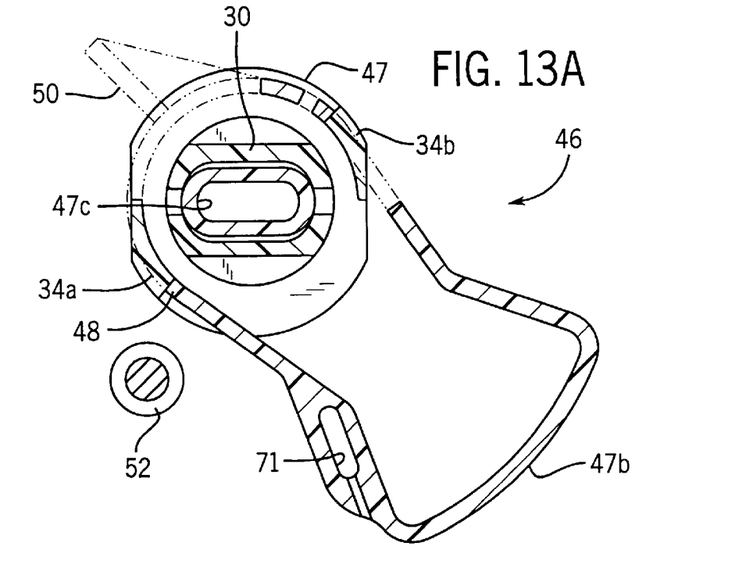
FIGS. 13A and 13B are fragmentary sectional views of the upper lever arm of FIG. 4 in the open and closed positions, respectively.
Figure 13B:
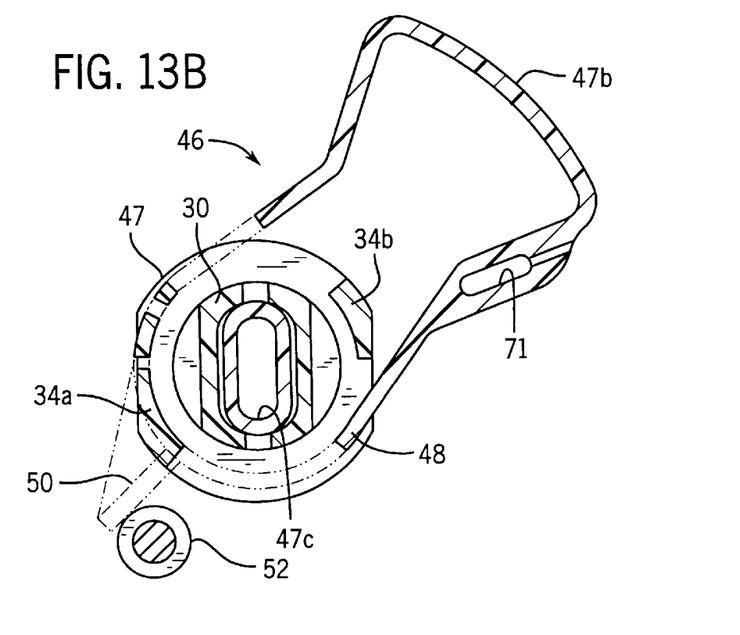

Referring to FIGS. 1, 2 and 3, a rotatable damper blade assembly 10 is positioned within a housing 12 interposed within the duct work of a heating and cooling system (not shown). Housing 12 includes a top wall 14, a bottom wall 16 and a pair of parallel, spaced apart, flanged sidewalls 18, 20. A set of fasteners 22 passes through suitable apertures 24 on sidewalls 18, 20, and is screwed into threaded guideways 26 formed on top wall 14 and bottom wall 16 to hold housing 12 together. A first or upper rotatable damper blade 28 is provided at each end thereof with a stub shaft 30 having an inner end which is fixedly secured in a hollow channel 32 running longitudinally of damper blade 28. An outer end of stub shaft 30 is disposed for rotation in a circular bearing retainer 34 friction fitted into opening 36 on each sidewall 18, 20. Alternately, bearing retainer 34 can be snap fit into opening 36. The bearing retainer 34 is integrally formed with a first raised rim or stop 34a (FIGS. 13A–13B) defining a damper blade open position and a second raised rim or stop 34b spaced from the first stop 34a defining a damper blade closed position. A second or lower damper blade 38 is disposed beneath first rotatable damper blade 28, and also includes stub shafts 40 and circular bearing retainers 42 with stops 42a, 42b (FIGS. 14a, 14b) constructed and mounted in openings 44 identically as described above with respect to bearing retainer 34. As is well understood, first and second damper blades 28, 38 are designed to rotate between an open or horizontally disposed position (FIGS. 4 and 5) so as to permit air flow through a particular sector of duct work, and a closed or vertically oriented position (FIGS. 6 and 7) so as to block air flow in a particular sector of the duct work.

Figure 5:
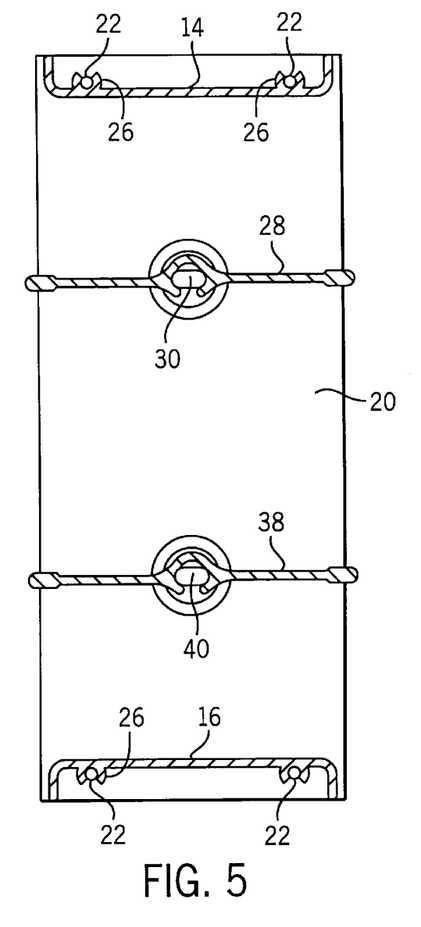
FIG. 5 is a sectional view of the damper control shown in the open position as taken on line 5—5 of FIG. 1.
Figure 6:
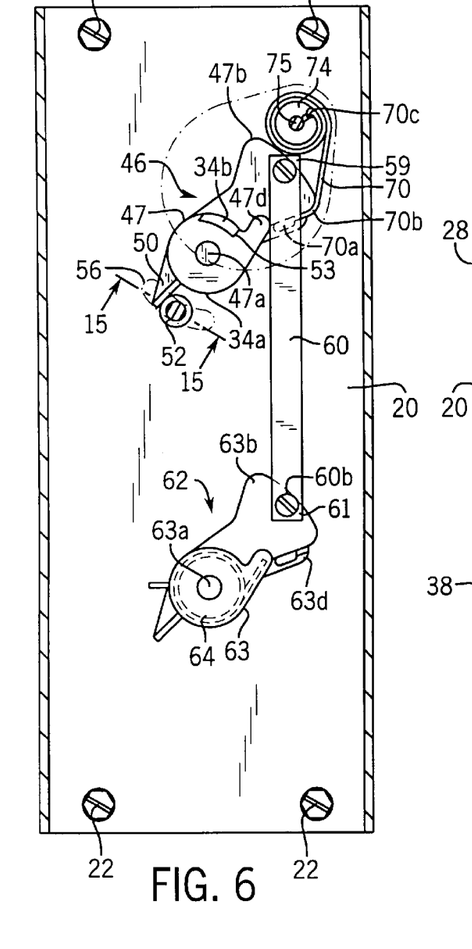
FIGS. 6 and 7 are views similar to FIGS. 4 and 5 but showing the damper control in the closed position.
Figure 7:
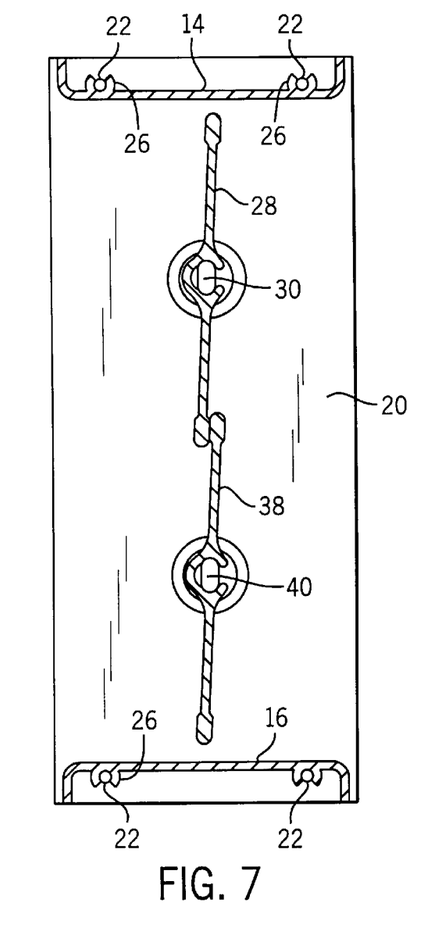
Figure 8:
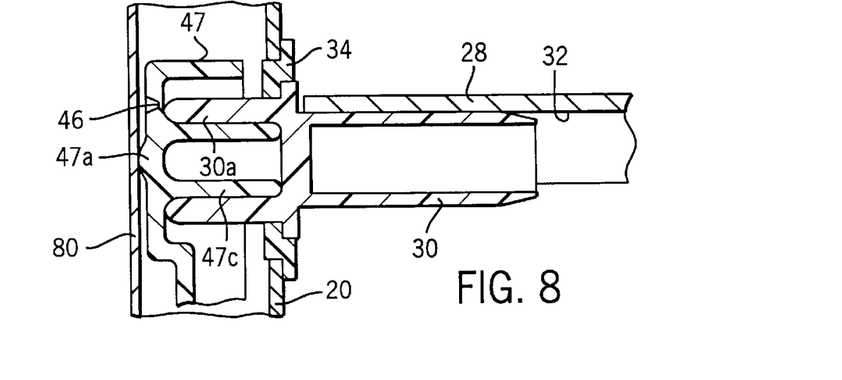
FIG. 8 is a sectional view on line 8—8 of FIG. 4.
Figure 9:
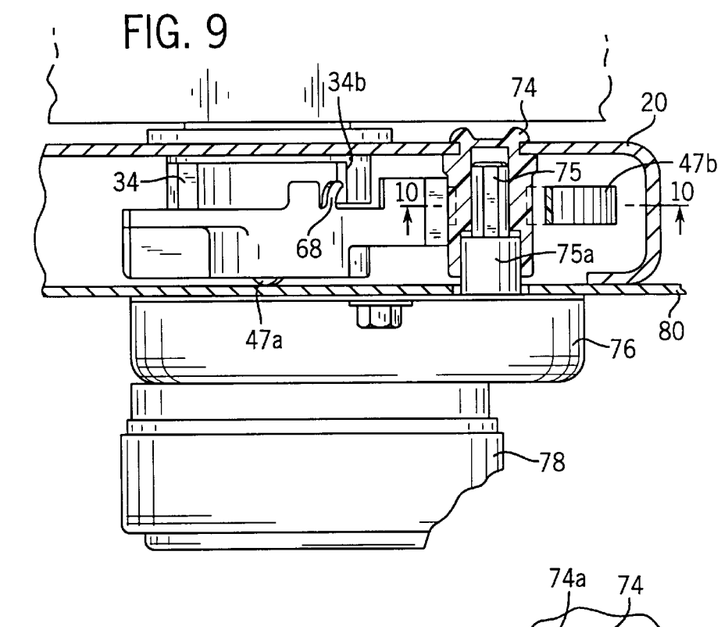
FIG. 9 is a sectional view on line 9—9 of FIG. 4 showing the interconnection between a motor shaft and a spool of the present invention.

As seen in FIGS. 3–8, a first or upper lever arm 46 having a circular hub 47 with a spherical protrusion 47a and a fish-tail shaped portion 47b integral therewith is friction fitted via a depending skirt 47c (FIG. 8) on the outer end 30a of stub shaft 30 for rotation therewith. The hub 47 includes an eccentric finger 47d for a purpose to be appreciated hereafter. Lever arm 46 is provided with a pair of spaced apart stop surfaces 48, 50. Stop surface 48 (FIGS. 13A, 13B) is notched into the bottom of hub 47 and is engageable with the first stop 34a on bearing retainer 34 lying beneath lever arm 46, and corresponding to the fully open position of damper blades 28, 38 (FIG. 5). The other stop surface 50 extends outwardly from the periphery of hub 47 and is engageable with an adjustable stop post 52 (FIG. 6) extending inwardly from a face plate or motor plate 80 corresponding to the fully closed position of damper blades 28, 38 (FIG. 7). Stop post 52 is adjustable by removing screw 54 (FIG. 15) threaded into stop post 52, and moving the stop post 52 along a slot 56 (FIGS. 4, 6) formed in motor plate 80 so as to change the closed position as desired. Lever arm 62 has a similar notch 62a engageable with stops 42a to define the open position (FIG. 14A) An elongated tension member in the form of a link 60 has an upper end formed with a first clearance hole 60a, the circular wall of which is snap fitted over a first pivot post 59 (FIG. 4) on lever arm 46. A lower end of link 60 has a second clearance hole 60b, the circular wall of which is snap fitted over a second pivot post 61 (FIG. 6) of a second or lower lever arm 62 mounted on rotatable stub shaft 40 of lower damper blade 38 by a friction fit. Lever arm 62 is constructed identical to lever arm 46 and enables a modular design in which lever arms may be freely substituted and added according to the damper blades desired, there being one lever arm for each damper blade. Elements 63a, 63b and 63d correspond to elements 47a, 47b and 47d, respectively. Link 60 and lower lever arm 62 function to transmit motion from upper damper components to lower damper components so that upper damper blade 28 and lower damper blade 38 will move in unison. In the preferred embodiment, the link 60 is typically a rigid element fabricated from metal or plastic but the invention also contemplates a non-rigid link as will be appreciated hereafter.

Figure 14A:
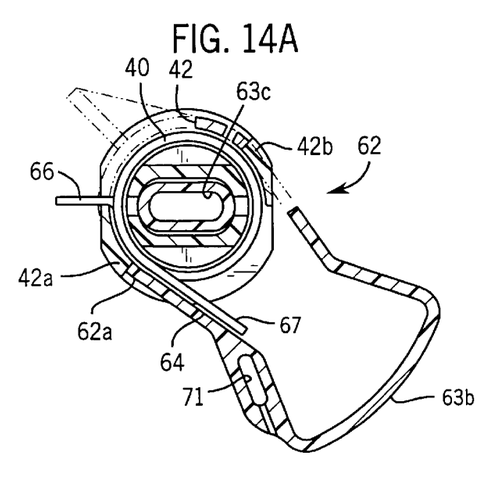
FIGS. 14A and 14B are sectional views similar to FIGS. 13A and 13B taken on line 14A of FIG. 12 showing the lower lever arm in open and closed positions, respectively.
Figure 14B:
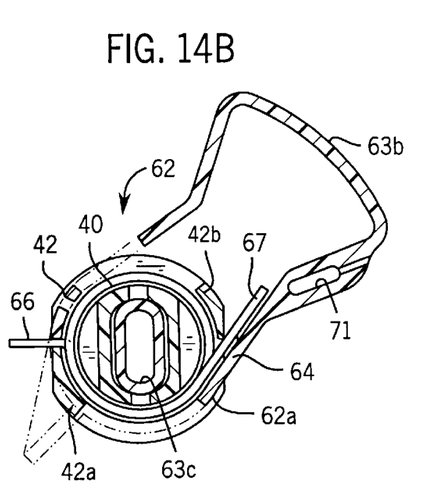
Figure 15:
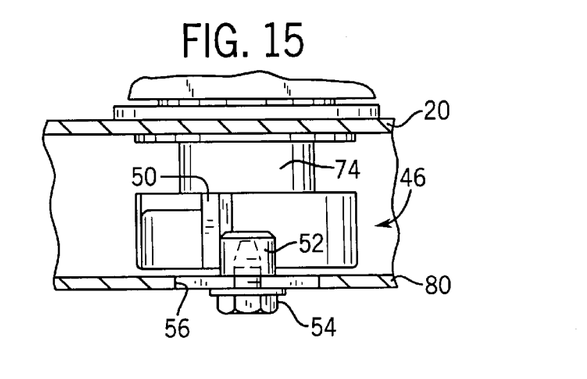
FIG. 15 is a sectional view on line 15—15 of FIG. 6.
Figure 17:
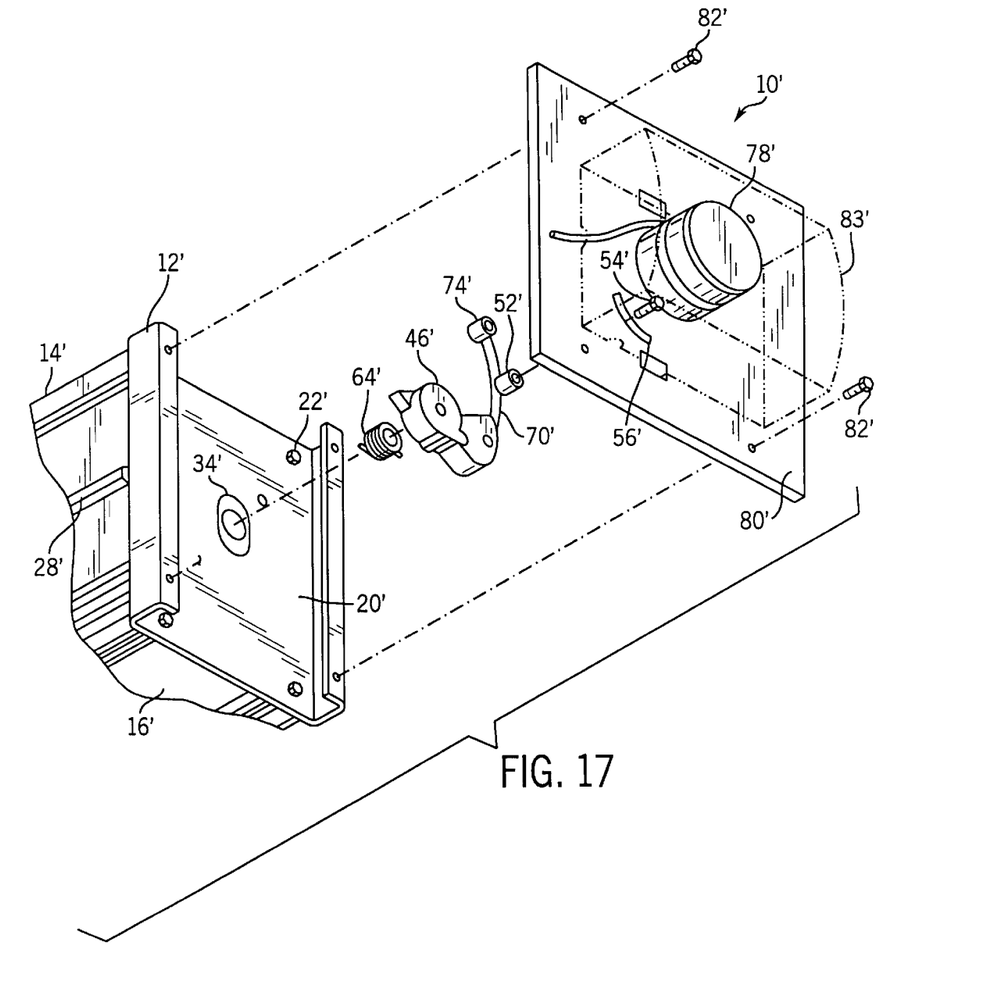
FIG. 17 is a partial exploded view of a damper control embodying the present invention so as to control the movement of a single damper blade.

A torsion spring 64 surrounds stub shaft 40 between sidewall 20 and lever arm 62, and is nested beneath and within the finger 63d of lever arm 62. One end 66 of spring 64 is held against stop 42a and a second end 67 bears against portion 63b beneath the finger 63d. (FIGS. 14A and 14B) Spring 64 is normally disposed in a condition which acts to rotate shafts 30, 40, lever arms 46, 62 and damper blades 28, 38 in a clockwise rotation to the fully opened position with stop surface 48 contacting stop 34a. Lever arm 62 has similar notch 62a engageable with stops 42a to define the open position (FIG. 14A). In the twin damper blade design, torsion spring 64 is shown positioned around the lower stub shaft 40. In the non-rigid link embodiment, the spring force acting on the lower lever arm 62 maintains a tensile load on the non-rigid link under all operating conditions. However, it should be understood that the torsion spring 64 may be installed around the upper stub shaft 30 for a single damper blade (as shown in FIG. 17) or around the lower stub shaft 40.

An additional feature of the invention shown in FIGS. 9, 12, 12a and 12b resides in a pair of trigger springs 68, 69 integrally formed on the bottom of the lever arms 46, 62. The purpose of the trigger spring 68, 69 is to eliminate free play between the damper blades 28, 38 caused by the clearance holes 60a, 60b in the link 60 and other dimensional variations on the elements of the control. The force applied by the trigger springs 68, 69 works opposite to the torsion spring 64 located on one of the lever arms 46, 62. The engagement of the closed stop of 42b by the lever arm 62 limits the travel of the torsion spring 64. By adding the trigger springs 68, 69, each lever arm 46, 62 will rotate until it contacts one side of the clearance hole 60a, 60b in the link 60. The torque produced by the torsion spring 64 is sufficient to overcome the combined torque of the integral springs 68, 69. This allows the damper blades 28, 38 to be held in open position while eliminating the free play.

Figure 10:
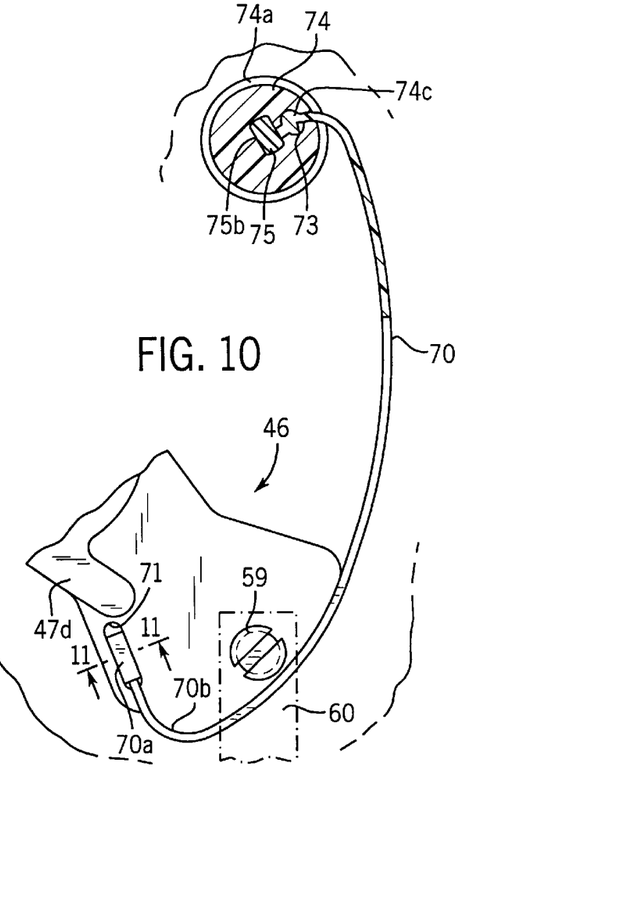
FIG. 10 is a partial sectional view taken on line 10—10 of FIG. 9.
Figure 11:
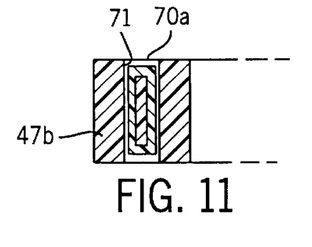
FIG. 11 is a sectional view taken on line 11—11 of FIG. 10.
Figure 12:
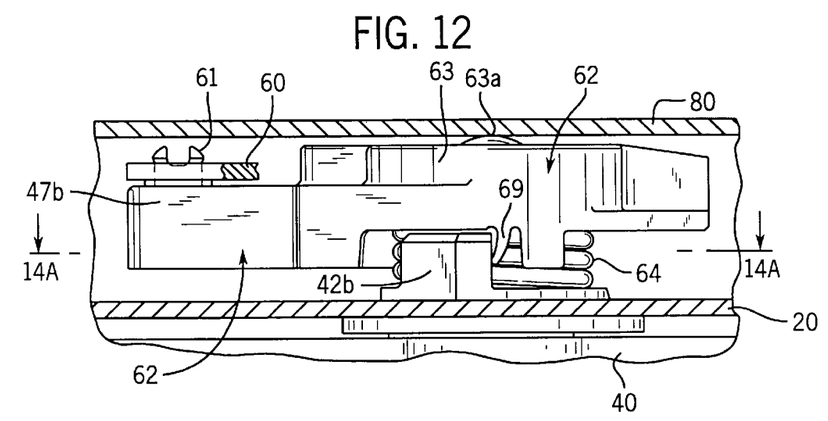
FIG. 12 is a sectional view taken on line 12—12 of FIG. 4.
Figure 12A:
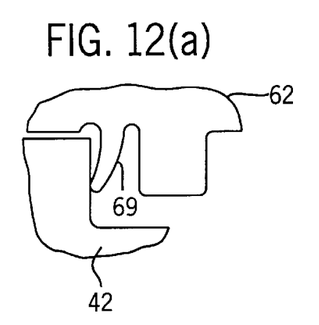
FIGS. 12(a) and 12(b) are diagrammatic views of an integral trigger spring.
Figure 12B:
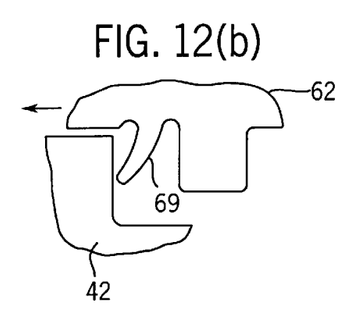

A flexible, reinforced belt or band 70 has a lug 70a (FIG. 10) at one end dropped into a retention slot 71 formed in one side of the fish-tailed portion 47b of lever arm 46, and a medial portion 70b extends about a peripheral surface 72 thereof. Another end 70c of band 70 is snapped into a retention slot 73 formed in take-up spool 74 rotatably disposed in an optional spool bearing 74a mounted in sidewall 20. Spool 74 is drivingly engageable with a shaft 75 (FIG. 9) having a flat 75b (FIG. 10) extending from a bearing 75a of a gear train 76 and an electric motor 78, both of which are mounted by fasteners 81 on the outside of motor plate 80 which in turn is secured to sidewall 20 by fasteners 82. A loose fit between the shaft 75 and the spool 74 compensates for misalignment of the parts during assembly. Motor 78 is preferably a 24 volt AC synchronous hysteresis motor which can be stalled indefinitely without overheating so as to maintain damper blades 28, 38 in their closed position as long as desired. As seen in FIGS. 1 and 2, gear train 76 and motor 78 are protected by an enclosure 83 which is removably secured to motor plate 80 by suitable clips 84 engageable in horizontal slots 86 formed in motor plate 80. As will be appreciated hereafter, motor 78, when selectively actuated, acts to rotate lever arms 46, 62 shafts 30, 40 and damper blades 28, 38 to the closed position against the force of spring 64.

Figure 16:
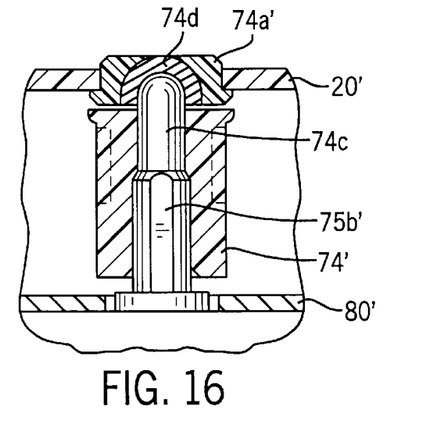
FIG. 16 is an alternative embodiment of the motor shaft and spool of FIG. 9.

Alternatively as shown in FIG. 16, the shaft 75 has a polygonal periphery 75b' for driving the spool 74' and a ball-type head 74c freely rotatable in a socket 74d fixed in the spool bearing 74a'. This version allows for a larger misalignment between cover plate 80' and sidewall 20' to be compensated for.

With the heating and cooling system in operation, motor 78 responds to a control arrangement which sends a signal corresponding to the thermostat in a specific zone of the system. Damper blade assembly 10 is designed so that movement of damper blades 28, 38 by the spring force to their open position (FIGS. 4 and 5), creates slack in band 70 thereby preventing damaging force from being transferred to the motor 78 and its relatively fragile gear train 76. When motor 78 is energized as dictated by the control arrangement, motor 78 and gear train 76 will rotate spool 74 such that band 70 will be wound thereon, and will transfer a pulling force which overcomes spring 64 to rotate lever arms 46, 62, shafts 30, 40 and damper blades 28, 38 to their closed position (FIGS. 6 and 7) at which stop surface 50 engages stop post 52. It should also be seen that the spring 64 is engaged with the underside of hub 47 of lever arm 62 as the damper blades 28, 38 move to a closed position. As long as motor 78 continues to be energized, damper blades 28, 38 remain closed.

When motor 78 is de-energized, the force of spring 64 will rotate the lever arms 46, 62 shafts 30, 40 and damper blades 28, 38, spool 74, motor 78 and gear train 76, which move together until stop surface 48 re-engages stop 34a. In a damper design without over-stress protection as provided by the present invention, gear train 76 and motor 78 would be subjected to a sudden stop, inflicting almost certain damage to these drive elements. Because of spool 74 and flexible band 70 which begins to unwind upon engagement between stop surface 48 and stop 34a, motor 78 and gear train 76 continue to rotate by their own inertia and enable a gradual braking or slowdown of motor 78 and gear train 76 due to internal friction to prevent damage thereto. Spool 74 and flexible band 70 thus act as a force translation arrangement in ensuring the positive opening and closing of damper blades 28, 38 without harm to the driving mechanism.

It should be appreciated that the present invention provides an improved damper drive mechanism which spares damage to driving motor 78 and gear train 76 through the use of a wind-up spool and band over-travel arrangement 74, 70 which allows motor 78 and gear train 76 to slowly decelerate. By employing this arrangement, damper blade assembly 10 is simplified by reducing the number of components, and enabling the assembly to use non-precision parts, both of which contribute to a lower production cost.

It should be further appreciated that the snap feature which connects the link 60 to the lever arms 46, 62 spaces the link 60 at a distance from the motor plate 80 so that no rubbing or dragging will occur. The lever arms 46, 62 are specifically manufactured to be assembled in proper orientation only when the torsion spring 64 is correctly installed. Spool bearing 74a supports spool 74 reducing side loading of motor 78 and helps improve the life of motor bearing 75a. In addition, the integral trigger springs 68, 69 eliminate wobble or rattle of the damper blades 28, 38. Owing to their modular design, the lever arms 46, 62 are both provided with retention slots 71 on the same side thereof so they can interchangeably connect to band 70. In addition, each of the lever arms 46, 62 is formed with the spherical protrusion 47*a* which provides a single low friction point engageable against motor plate 80. FIG. 17 illustrates a rotatable damper assembly 10' for a single damper blade 28' as described above. In this version, there is no need for counterparts of the lower lever arm 62 and the link 60. However, the torsion spring 64' is nested in the lever arm 46' and surrounds the stub shaft 30'. The band 70' and spool 74' are identical to those elements previously described.

Figure 18:
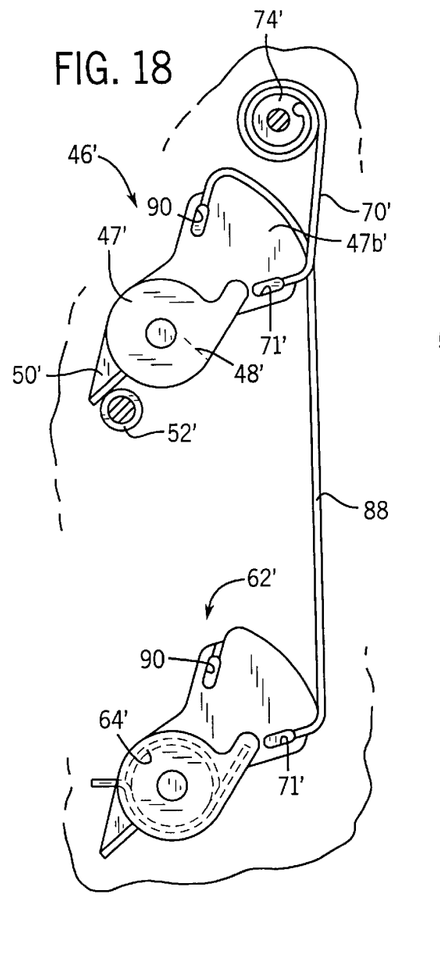
FIG. 18 is an alternate embodiment of a damper control in the closed position.
Figure 19:
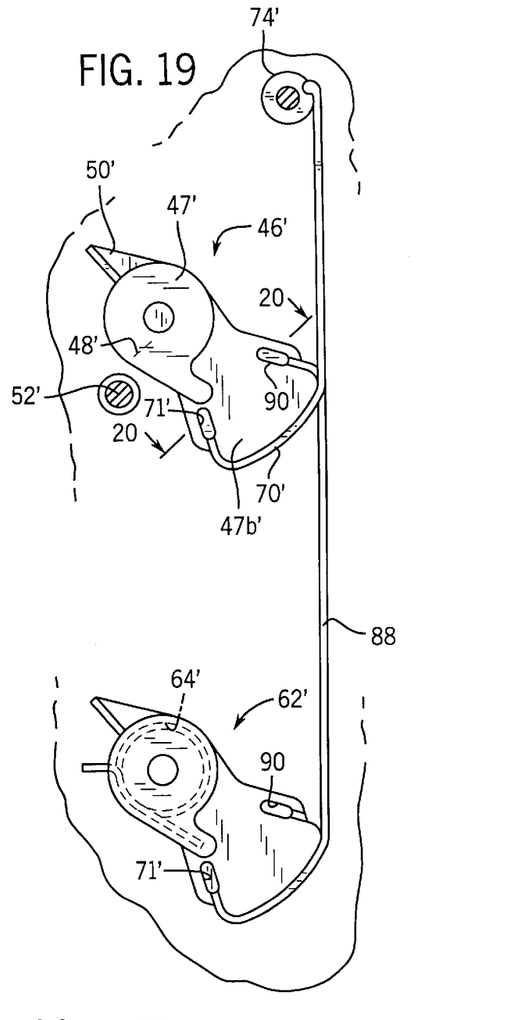
FIG. 19 is an alternative embodiment of the damper control of FIG. 18 in the open position.
Figure 20:
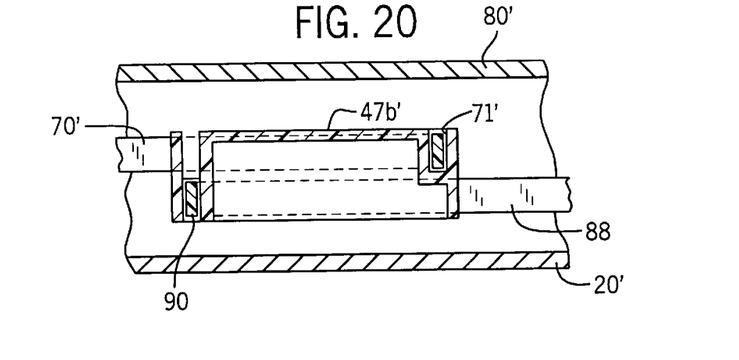
FIG. 20 is a sectional view taken on line 20—20 of FIG. 19.

FIGS. 18–20 show an alternative embodiment of the invention, wherein the elongated rigid link 60 is replaced by a non-rigid, flexible belt 88. In this version, the fish-tail shaped portion 47*b'* of upper lever arm 46 as well as lower lever arm 62' are each formed with a pair of belt retention slots 71', 90. As best seen in FIG. 20, each pair of slots 71' is vertically offset from the pair of slots 90 to prevent the band 70' from interfering with belt 88. As previously described, band 70' runs between spool 74' and retention slot 71' on upper lever arm 46'. Belt 88 runs between slot 90 on upper lever arm 46' and slot 71' on lower lever arm 62'. As the motor 78 wraps the band 70' around the spool 74', the upper lever arm 46' rotates. Since the turning arc is identical for both lever arms 46', 62', the length of belt 88 therebetween remains constant. This keeps the angular velocity and position of both lever arms constant. By placing the torsion spring 64' on the lever arm 62' farthest from the motor 78, and disposing the open stop 48' on the lever arm 46' closest to the motor 78, the connecting member is always in tension. This allows a flexible material like the belt 88 to be used in lieu of the rigid link 60 and eliminates all free play (i.e. rattle) from the assembly.

An additional advantage of this concept is the maximization of the mechanical advantage. This is accomplished by an increase in the moment arm as measured from the center of rotation to the location of applied force. The radiused lever arm keeps this distance at a maximum throughout the full range of motion.

Figure 21:
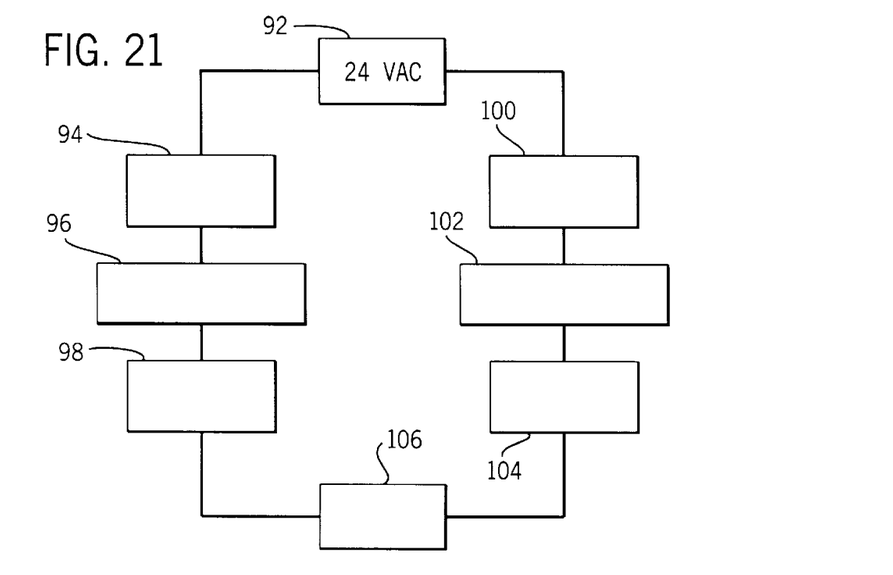
FIG. 21 is a circuit diagram according to a preferred embodiment of the invention.

Turning now to FIG. 21, there is shown a main circuit diagram representing the preferred embodiment of the invention. Broadly speaking, such main circuit comprises a power supply 92, such as a 24 volt AC source, a first motor 94 connected with a first thermostat 96 in a first circuit 98 for responding to the air demands in a first zone. Additionally, there is also a second motor 100 connected with a second thermostat 102 in a second circuit 104 for responding to air demands in a second zone. As is well known in the control arts, the main circuit includes a microprocessor 106 or other computer controlled device for coordinating the action required in each of the first and second zones.

Figure 22:
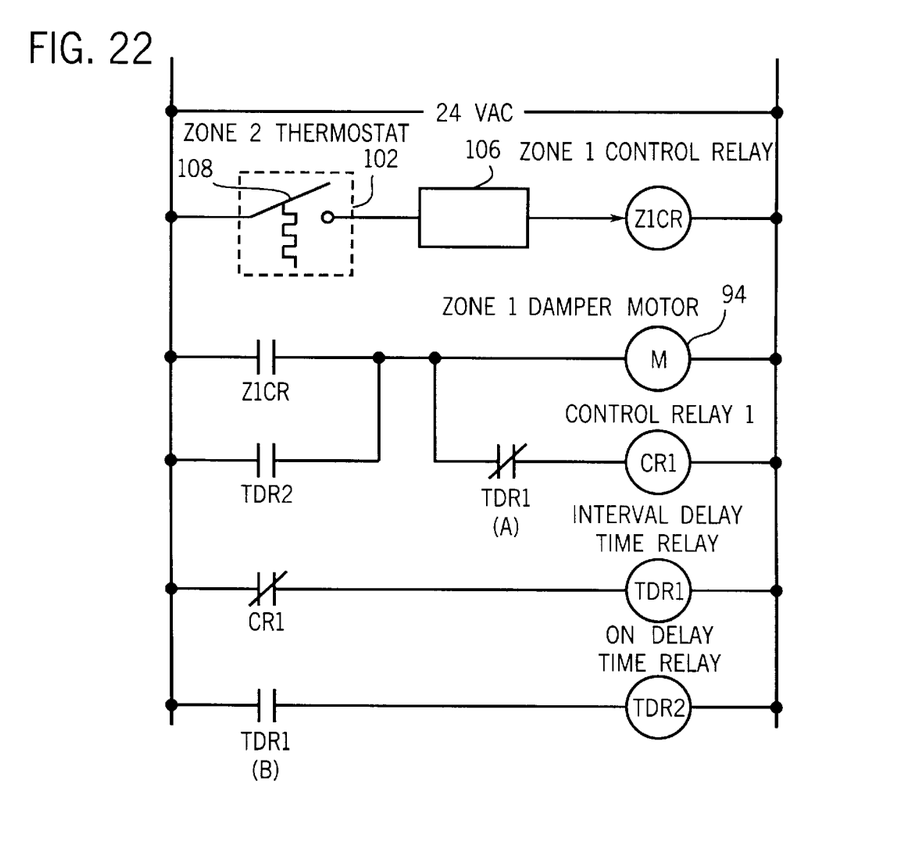
FIG. 22 is a ladder diagram of a pulsing circuit embodying the present invention.

FIG. 22 illustrates a ladder diagram representing the system controlled by micro-processor 106 and employed when the second thermostat 102 in the second zone calls for heating or cooling, closes a switch 108 for the zone 2 thermostat and transmits power to the zone 1 control relay Z1CR. This closes the Z1CR contact, thus powering the zone 1 damper motors and activating control relay 1 CR1. The motors close the dampers in zone 1. Control relay 1 CR1 opens contacts CR1 which in turn resets timer TDR1. These states are maintained so long as the zone 2 thermostat 102 remains closed. When the air conditioning needs of zone 2 are satisfied, the zone 2 thermostat switch 108 opens. Zone 1 control relay Z1CR is de-energized and opens contacts Z1CR, thus removing power from the zone 1 damper motors and control relay 1 Z1CR. The zone 1 dampers begin to open, contacts CR1 return to a closed state and activate timer TDR1. Timer TDR1 opens contact TDR1(A) to block power from reaching control relay 1 and closes contact TDR1(B), to supply power to timer TDR2. Timer TDR2 holds contacts TDR2 open for five seconds, then closes contacts TDR2 for one second. During this one second, power is supplied to the zone 1 damper motors to decelerate the opening speed. Timer TDR2 repeats this cycle three times before the 20 second time limit of time TDR1 is reached. Timer TDR1 now shuts off, opening contact TDR1(B) and deactivating TDR2. The system has returned to its rest state with no current flowing in any branch. The values used for timers TDR1 and TDR2 are typical. These values would be adjusted in an actual system to account for existing spring force, friction, internal mass, etc. The number of pulses to the motor 78 could be varied although it is suspected that two to eight pulses would be most useful.

The above-described control embodies one method of controlling the opening speed of the damper by momentarily turning the motor 78 on during the opening phase to provide a brief force counteracting spring 64. The motor on time is short enough that the damper is decelerated to almost zero, but does not stop or reverse direction. If the motor 78 is pulsed this way several times during the opening stroke, the damper speed is controlled and remains low, thus eliminating the detrimental noise, wear and overtravel effects. It should be understood that there are other electrical control and logic methods capable of achieving this motor control.

It should be appreciated that the present invention provides an improved damper control arrangement which reduces noise, spares damage and prevents overtravel of motor 78 and gear train 76 by positively controlling the opening speed of the damper blades 28, 30 electrically or mechanically. By employing either arrangement, damper blade assembly 10 is enhanced and refined such that service and maintenance costs are significantly reduced. In addition, the present invention eliminates the time delay created by the unwinding of the band and thereby improves the response time while continuing to avoid shock problems.

While the invention has been described with reference to a preferred embodiment, those skilled in the art will appreciate that certain substitutions, alterations and omissions may be made without departing from the spirit thereof. For example, although the preferred embodiment of the invention described herein shows flat damper construction, it should be understood that the invention can also be utilized with dampers having circular cross section and particularly those having a large diameter. Accordingly, the foregoing description is meant to be exemplary only, and should not be deemed limitative on the scope of the invention set forth with following claims.

We claim:

1. In a device for controlling the movement of a damper mounted in a housing between an open position and a closed position and having a shaft rotatably secured to said damper for pivoting said damper between said open position and said closed position, a lever arm mounted on said shaft for rotation therewith, a spring connected between said housing and said lever arm for normally urging said damper towards said open position, and a motor on said housing and actuable to overcome the force of said spring to move said damper to said closed position;

the improvement residing in:
    a control arrangement associated with said housing for periodically energizing and pulsing the motor for regulating the speed of said damper as said damper moves from said closed position to said open position.

2. The improvement of claim 1, wherein said control arrangement is an electrical arrangement.

3. The improvement of claim 1, wherein said control arrangement comprises at least one pulsing and logic circuit.

4. The improvement of claim 3, wherein said circuit includes:

a power source;

a first openable and closable thermostat controlling a first zone to be temperature controlled;

a second openable and closable thermostat controlling a second zone to be temperature controlled;

a first control circuit and a second control circuit for controlling said dampers in response to output signals from the first and second thermostats; and a microprocessor for controlling said first control circuit and said second control circuit depending upon the demand in said first zone and second zone.

5. The improvement of claim 4, wherein said first control circuit and said second control circuit each include:

a first control relay having a first set of openable and closable contacts;

a second control relay having a second set of openable and closable contacts;

a first resettable timer having first and second sets of openable and closable contacts; and a second resettable timer having a first set of openable and closable contacts.

6. The improvement of claim 5, wherein said first set of contacts of said first timer is closed and said second set of contacts of said second control relay is closed when said second thermostat is open.

7. The improvement of claim 6, wherein, upon closing of said second thermostat, said first control relay and said first set of contacts of said first control relay close to actuate said motor so as to close said damper, said second control relay being actuated to open said second set of contacts of said second control relay and reset said first timer.

8. The improvement of claim 7, wherein upon reopening of said second thermostat, said first control relay is de-energized and said first set of contacts of said first control relay open removing power from said motor and said second control relay, and causing said damper in said first zone to begin to open, said second set of contacts of said second control relay closing to activate said first timer to open said first set of contacts of said first timer to block power from reaching said second control relay and close said second set of contacts of said first timer to supply power to said second timer.

9. The improvement of claim 8, wherein said second timer establishes a cycle holding said first set of contacts of said second timer open for a first predetermined amount of time, and then closing said first set of contacts of said second timer for a second predetermined amount of time during which power is supplied to said motor of said first zone to decelerate the opening speed thereof.

10. The improvement of claim 9, wherein said second timer repeats said cycle before a third predetermined amount of time is reached after which said first timer deactivates to open said second set of contacts of said first timer and deactivates said second timer.

11. A device for controlling the movement of a damper mounted in a housing between an open position and a closed position, the device comprising:

a shaft rotatably secured to said damper for pivoting said damper between said open position and said closed position;

a lever arm mounted on said shaft for rotation therewith;

a spring connected between said housing and said lever arm for normally urging said damper towards said open position;

a motor mounted on said housing and actuable to overcome the force of said spring to move said damper to said closed position;

a wind-up spool mounted on said housing in driving engagement with said motor;

a flexible band connected between said lever arm and said spool, said band being selectively windable and unwindable from said spool; and a control arrangement connected to said motor for periodically energizing said motor to control the speed of said damper as said damper moves from said closed position to said open position to thereby reduce the noise, wear and overtravel effects normally occurring in said device.

* * * * *